United States Patent
Tanaka et al.

(10) Patent No.: US 6,539,291 B1
(45) Date of Patent: Mar. 25, 2003

(54) AIRBORNE TURBULENCE ALERT SYSTEM

(75) Inventors: Hidetoshi Tanaka, Tokyo (JP); Shunpei Kameyama, Tokyo (JP); Wakasa Kise, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/959,951
(22) PCT Filed: Apr. 25, 2000
(86) PCT No.: PCT/JP00/02706
§ 371 (c)(1), (2), (4) Date: Nov. 13, 2001
(87) PCT Pub. No.: WO01/81946
PCT Pub. Date: Nov. 1, 2001

(51) Int. Cl.⁷ .............................................. G06F 17/00
(52) U.S. Cl. ................................ 701/9; 701/7; 701/13; 340/438; 244/158 R; 244/163
(58) Field of Search ............................ 701/7, 9, 13, 14; 340/438, 439; 73/170.02, 170.07, 170.12; 244/158 R, 163, 203

(56) References Cited

U.S. PATENT DOCUMENTS 5,285,070 A * 2/1994 Barrett ..................... 250/338.5
5,974,875 A * 11/1999 Leslie et al. .............. 73/170.07
6,070,460 A * 6/2000 Leslie et al. .............. 73/170.07
6,237,405 B1 * 5/2001 Leslie ....................... 73/170.07

FOREIGN PATENT DOCUMENTS

| JP | A5-508930 | 12/1993 |
| JP | A6-500860 | 1/1994 |
| JP | A6-500861 | 1/1994 |

* cited by examiner

*Primary Examiner*—Gertrude Arthur
(74) *Attorney, Agent, or Firm*—Birch, Stewart, Kolasch & Birch, LLP

(57) ABSTRACT

A parent unit is provided having: a precedent base for accumulating data from child units; an element data determination unit for processing the data into element data; an element data classification unit for creating a classification; an element data change classification unit for determining which classification the element data belongs to, and calculates transition probabilities among the classifications, and a display unit for displaying data. The child unit collects air current data, processes the data, obtains the transition probabilities, and calculates a probability of encountering air turbulence. The child unit then displays certain data when the probability of encountering air turbulence satisfies predetermined conditions.

5 Claims, 10 Drawing Sheets

FIG. 4

Table 701:

| AIRCRAFT IDENTIFIER | TIME | POSITION | | | FORWARD DIRECTIONAL VELOCITY VECTOR | | | SURROUNDINGS | | | 5km IN FRONT OF AIRCRAFT | 10km IN FRONT OF AIRCRAFT |
|---|---|---|---|---|---|---|---|---|---|---|---|---|
| | | LATITUDE | LONGI-TUDE | ALTI-TUDE | VELOCITY (m/s) | DIREC-TION | ANGLE OF ELEVATION | AIR TURBULENCE ENCOUNTER | TEMPE-RATURE (°C) | HUMI-DITY (%) | MEASURED AIR FLOW VELOCITY (m/s) | MEASURED AIR FLOW VELOCITY |
| F101 | 15:40 | 42 | 140 | 10 | 100 | 120 | 0 | — | −20 | 0.1 | 10 | 5 |
| F101 | 15:41 | 42 | 140 | 10 | 100 | 120 | 0 | — | −20 | 0.1 | 10 | 5 |
| F101 | 15:42 | 42 | 139 | 10 | 100 | 120 | 0 | — | −20 | 0.1 | 5 | 5 |
| F101 | 15:43 | 41 | 139 | 10 | 100 | 120 | 0 | ○ | −20 | 0.1 | 3 | 1 |

Table 702:

| ATTRIBUTE | | |
|---|---|---|
| LATITUDE RANGE | 41 | 43 |
| LONGITUDE RANGE | 139 | 141 |
| ALTITUDE RANGE | 0 | — |
| TIME FRAME | 15:40 | 15:43 |
| WINDOW WIDTH | 2 | |
| WINDOW INTERVAL | 2 | |
| WINDOW PATTERN | +0 | +− |
| | +− | |

Table 703:

| AIRCRAFT IDENTIFIER | TIME | +0 | | | | +− | | | | TURBULENCE ENCOUNTER |
|---|---|---|---|---|---|---|---|---|---|---|
| | | TEMPERATURE | VELOCITY AT 5 | VELOCITY AT 10 | TEMPERATURE | VELOCITY AT 5 | VELOCITY AT 10 | | | |
| F101 | 15:40 | −20 | 10 | 5 | 0 | 5 | 3 | 0 | 0 | — |
| F101 | 15:42 | −20 | 5 | 5 | 1 | 3 | 2 | 2 | 2 | ○ |

FIG. 5

| MIXTURE DISTRIBUTION IDENTIFIER | MIXTURE PROPORTION | AVERAGE | | | | | | | | STANDARD DEVIATION | | | | | |
|---|---|---|---|---|---|---|---|---|---|---|---|---|---|---|---|
| | | +0 | | | +− | | | | | +0 | | | +− | | |
| | | TEMPE-RATURE | VELOCITY AT 5 | VELOCITY AT 10 | TEMPE-RATURE | VELOCITY AT 5 | VELOCITY AT 10 | | | TEMPE-RATURE | VELOCITY AT 5 | VELOCITY AT 10 | TEMPE-RATURE | VELOCITY AT 5 | VELOCITY AT 10 |
| A0 | 41 | −20 | 10 | 10 | 0 | 0 | 0 | | | 1.1 | 2.5 | 2.3 | 0.2 | 0.4 | 0.5 |
| A1 | 16 | −19 | 4 | 3 | −1 | 4 | 3 | | | 2.3 | 1.2 | 1.3 | 0.3 | 0.3 | 0.4 |
| A2 | 25 | −20 | 5 | 3 | 1 | −1 | −3 | | | 0.5 | 0.8 | 1.5 | 0.5 | 0.5 | 0.8 |
| A3 | 18 | −20 | 5 | 3 | 0 | 0 | 1 | | | 1.6 | 1.3 | 3.1 | 0.2 | 0.3 | 0.4 |

FIG. 6

| AIRCRAFT IDENTIFIER | TIME | +0 | | | +- | | | TURBULENCE ENCOUNTER | MIXTURE DISTRIBUTION IDENTIFIER |
|---|---|---|---|---|---|---|---|---|---|
| | | TEMPE-RATURE | VELOCITY AT 5 | VELOCITY AT 10 | TEMPE-RATURE | VELOCITY AT 5 | VELOCITY AT 10 | | |
| F101 | 15:40 | −20 | 10 | 5 | 0 | 0 | 0 | − | A1 |
| F101 | 15:42 | −20 | 5 | 3 | 1 | 2 | 2 | O | B3 |
| F102 | 15:40 | −20 | 10 | 5 | 0 | 0 | 0 | − | A1 |
| F102 | 15:42 | −20 | 5 | 3 | 1 | 2 | 2 | O | B0 |
| F102 | 15:44 | −19 | 5 | 7 | 1 | 2 | −2 | O | B4 |

FIG. 7

| 0 | A0 | A1 | A2 | A3 | B0 | B1 | B2 |
|---|---|---|---|---|---|---|---|
| A0 | A0→A0 | A0→A1 | | | | | A0→B2 |
| A1 | A1→A0 | | | | | | |
| A2 | | | | | | | |
| A3 | | | TRANSITION PROBABILITY BETWEEN | | | | |
| B0 | | | ADJACENT ELEMENT DATA | | | | |
| B1 | | | | | | | |
| B2 | B2→A0 | | | | | | B2→B2 |

⌒ 1001

| 0 | A0 | A1 | A2 | A3 | B0 | B1 | B2 |
|---|---|---|---|---|---|---|---|
| A0 | A0→A0 | A0→A1 | | | | | A0→B2 |
| A1 | A1→A0 | | | | | | |
| A2 | | | | | | | |
| A3 | | | TRANSITION PROBABILITY BETWEEN | | | | |
| B0 | | | ELEMENT DATA SEPARATED BY ONE | | | | |
| B1 | | | | | | | |
| B2 | B2→A0 | | | | | | B2→B2 |

⌒ 1002

AIRBORNE TURBULENCE ALERT SYSTEM

This application is the national phase under 35 U.S.C. § 371 of PCT International Application No. PCT/JP00/02706 which has an International filing date of Apr. 25, 2000, which designated the United States of America.

TECHNICAL FIELD

The present invention pertains to an aircraft-mounted air turbulence warning system in which a measuring device mounted on the aircraft is used to collect air turbulence data, and also random atmosphere simulation is used to supplement the amount of data, thereby predicting air turbulence and emitting a warning based on the collected data.

BACKGROUND ART

The following applications have already been submitted in relation to an aircraft-mounted air turbulence warning system.

JP-A-5-508930 discloses a radar device in which a determination as to whether to perform a warning or not is made based on whether or not a wind shear velocity detected by radar is within a specified range.

Further, JP-A-6-500860 discloses a radar system in which air turbulence is determined to exist in the case when deviations in wind velocity detected by aircraft-mounted radar are greater than those in a case of non-turbulence or minor air turbulence with no danger.

Additionally, JP-A-6-500861 discloses a radar system in which a microburst is determined based on a wind velocity measured by an upper radar mounted on the aircraft and a wind shear is determined based on a wind velocity measured by a lower radar, in a case where the velocity exceeds a threshold.

FIG. 10 depicts a conventional aircraft-mounted air turbulence warning system. In FIG. 10, radar is used by the measuring unit 201 to measure airflow around the aircraft. The radar obtains a relative measurement value of the airflow in relation to the aircraft. For example, with reference to FIG. 3, a difference is obtained between an aircraft velocity vector 501 and an aircraft forward directional component 503 of an airflow velocity vector 502. This differential is referred to hereinafter as a measured airflow velocity. Measurement of the measured airflow velocity is made at a plurality of points, and the velocity of the airflow toward each of the points is calculated from the aircraft velocity vector and the measured airflow velocity, so that, assuming that the wind velocity and wind direction are consistent across the various points, the airflow velocity vector can be calculated.

At a determination unit 203 a determination is made as to whether the aircraft is approaching dangerous air turbulence for which a warning should be made. In JP-A-5-508930 this determination is made, for example, based on shear wind velocity, and in JP-A-6-500860 the determination is made on wind velocity deviations, and in JP-A-6-500861 it is made on the wind velocity of the microburst core measured by the upper radar, and the wind velocity of the wind shear measured by the lower radar. The airflow velocity vector is derived from the measured airflow velocity and the aircraft velocity vector, and then reference is made to threshold information 202 to determine whether or not the aircraft is approaching dangerous air turbulence.

Threshold information 202 accumulates a range of values pertinent to the criteria used by the determination unit 203. When the determination unit 203 has determined that the aircraft is approaching a turbulent airflow, a display unit 204 informs the user of that fact.

In an aircraft-mounted air turbulence warning system which uses a format mentioned above as the above prior art, an airflow model is prepared in advance, and the results obtained from measuring the surround airflow are then fitted into the model so that the determination as to whether the aircraft is approaching turbulent flow or not can be performed. For example, in Japanese Patent Translation Publication No. Hei 6-500861 mentioned above, using a model of a whirl and based on an assumption that the aircraft is in flight near a ground surface, which is to say a premise that the aircraft it is passing below a whirl created by airflow, and that a microburst core exists above it and a shear exists below, the measurement results are fitted into these, and when this fits a judgment is determined that the aircraft is approaching a turbulent flow.

Accordingly, in the case when the airflow model is not a precise model, for example, it is not known in advance in the case where the aircraft is flying at high altitudes, which part of the whirl of the air flow the aircraft will encounter, there was a problem that it was impossible to issue the warning.

The present invention was devised in order to solve such a problem; therefore, an object thereof is to obtain an aircraft-mounted air turbulence warning system in which an accumulation of actual data is used as a basis for performing in parallel fashion the building of models by classifying data, the selecting of a model by determining a class to which data belongs and the predicting of air turbulence, producing the result that it is possible to predict the turbulent flow even in the case when the airflow model is not clearly specified in advance.

SUMMARY OF THE INVENTION

In an aircraft-mounted air turbulence warning system according to the present invention, there is provided a system in which a measuring device mounted on an aircraft is used to collect air current data for predicting air turbulence and issuing a warning based on this data, the system being provided with:

a parent unit having:
  a precedent base for accumulating data notified from a plurality of child units;
  an element data determination unit for processing the data in the precedent base, turning it into element data based on a predetermined designation of a range that is subject to this processing, and storing the element data is a classification precedent base;
  an element data classification unit for creating an aggregation of element data based on results, which are written in the element data in the classification precedent base, of a determination as to whether the aircraft is to encounter air turbulence, classifying each element data aggregation to create a classification chart and recording this in the classification precedent base;
  an element data change classification unit for determining which classification the element data in the classification precedent base belongs to and describing this as a change chart in the classification precedent base, and based on this change chart, summing changes of a classification identifier of each aircraft classification identifier, and calculating transition probabilities among the classifications and describing these as a status transition chart in the classification precedent base;

a classification precedent base for storing the element data, the classification chart, the change chart and the status transition chart; and a display unit for displaying the change chart and the status transition chart;

and a child unit having:

a measurement unit for collecting the air current data and notifying the data to the precedent base;

a child unit element data determination unit for processing data collected by the measurement unit based on the subject range that was designated as being the subject of the processing and turning it into the element data, and outputting this to a child unit element data class determination unit;

the child unit element data classification determination unit for referencing a mixture distribution chart in the child unit classification precedent base, determining which element distribution in the mixture distribution chart each of the element data processed by the child unit element data determination unit should belong to and informing a child unit display unit of an element distribution identifier which it has determined; and also, referencing the status transition chart, obtaining transition probabilities from the element distribution to all of the element distributions, informing the child unit display unit of these transition probabilities, calculating a probability of encountering air turbulence based on the transition probabilities and whether or not the mixture distribution chart indicates an air turbulence encounter and informing this probability of encountering air turbulence to the child unit display unit;

the child unit classification precedent base for making a request to the classification precedent base and obtaining the classification chart and the status transition chart, and providing these according to a request from the child unit element data classification determination unit; and the child unit display unit for displaying the class element distribution, the transition probabilities and the probability of encountering air turbulence obtained from the child unit element data classification determination unit, and issuing a warning in the case when the probability of encountering air turbulence satisfies predetermined conditions.

Further, the system is further provided with a random atmospheric modeling unit for using regional data from the vicinity surrounding the parent unit to perform a simulation of airflow, randomly generating a velocity vector and a position for a mock aircraft in this simulation and making this mock aircraft perform a mock flight, generating mock measurement results which should be measured by the measurement unit of the child unit in the case when the child unit were mounted on the mock aircraft and notifying these results to the element data determination unit, and the element data determination unit processes the data from the precedent base and the random atmospheric modeling unit in accordance with the predetermined range being designated as the subject of this processing and turns the data into the element data, and records this in the classification precedent base.

Further, classification is performed by, assuming a mixture distribution made up of a plurality of distributions, estimating the mixing proportions and the mixture distribution parameters of the element distributions;

the classification precedent base accumulates correspondences between the mixture distribution parameters and the element distribution identifiers, and correspondences between the element distribution identifiers and the element data;

the element data classification unit inputs the number of distributions assumed to be mixed, obtains mixture distribution parameters by preparing the element data as the mixture distribution based on the mixture number and records in the classification precedent base correspondences between the mixture distribution identifiers and the mixture distribution parameters; and the child unit element data classification determination unit determines which element distribution the element data belongs to, and records in the classification precedent base correspondences between the element data and the element distribution identifiers corresponding to the element data.

Further, the element distribution is a multi-dimensional normal distribution having no covariance component, and mixture distribution parameters are sought for a mixture distribution made up of a predetermined number of the element distributions to be added that are added with weights, and correspondences between the mixture distribution identifiers and the mixture distribution parameters are recorded in the classification precedent base;

the element data change classification unit makes each element data belong to the element distribution in which the product of the probability density of the element data of that element distribution and the mixing proportion for that element distribution is the greatest of all the element distributions, and the element data classification unit performs the following steps of:

a subject range investigation step in which an average, a variance; a number of types of values and a total number of values which are not null values are investigated with respect to each attribute;

an initial distribution generation step in which the initial distribution for an element distribution, which has the initial values such that the average values of the attributes are to be average values which are mutually different from each other with respect to the items being measured for which there are a predetermined number or more of types of values, and for measured items having less than the predetermined number of types of values, the average values are chosen from among the types of values, and for the variance, an appropriate number such as a number other than 0 is obtained, is generated for a number equal to the number of classifications;

a repeating improvement step having an expectation value calculation sub-step, in which provisional averages, variances and mixing proportion for each of the element distributions are used as a basis to calculate probability density for each of the data elements; an element distribution updating sub-step S232, in which for each element data a probability density ratio is calculated for each provisional element distribution and is used as a proportion of contribution therefrom, for each element distribution the contribution is multiplied by the values of each element data to obtain a value, the number of pieces of element data is obtained as a sum total of the respective proportions of contribution, and this value and this sum total are used as a basis for a new average and a variance for the provisional element distribution; and a completion determination substep, in which changes in, the parameter combinations of the provisional distribution are monitored, and the repeating improvement ends when the parameter combination does not change during the course of the number of repetitions, or when the same parameter combination repeatedly appears a predetermined number of times, or when the number of repetitions has been executed a predetermined number of times; and a completion step, in which the parameter combination which has been obtained is recorded into the classification precedent base together with an element distribution identifier.

Additionally, the repeating improvement step comprises the following steps of:

an expectation value calculation sub-step, in which provisional averages, variances and mixing proportion for each of the element distributions are used as a basis to calculate probability density for each of the element data, an annealing parameter greater than 0 and equal to or less than 1 is used to record the probability density raised to the power of the annealing parameter;

an element distribution updating sub-step, in which for each element data the ratio among the probability densities for each provisional element distribution, which have been raised to the power of the annealing parameter and recorded in the initial value calculation sub-step, is calculated and this is used as a proportion of contribution therefrom, for each element distribution the contribution is multiplied by the values of each element data to obtain a value, the number of pieces of element data is obtained as a sum total of the respective proportions of contribution, and this value and this sum total are used as a basis for a new average and variance for the provisional element distribution;

a completion determination sub-step, in which changes in the parameter combinations of the provisional distribution are monitored, and the repetition of the annealing parameter ends when the parameter combination does not change during the course of the number of repetitions, or when the same parameter combination repeatedly appears a predetermined number of times, or when the number of repetitions has been executed a predetermined number of times; and an annealing sub-step, in which the outer side of the repetition is ended in the case when the value of the annealing parameter is increased in accordance with a predetermined plan, the procedure subsequent to the anticipated value calculation sub-step is repeated and the annealing parameter has become equal to or greater than 1.

BRIEF DESCRIPTION OF THE DRAWINGS

FIG. 4 is an explanatory diagram of an example of element data and rules for processing the element data.

FIG. 5 is a chart depicting one example of a mixture distribution chart.

FIG. 6 is a chart depicting one example of a change chart.

FIG. 7 is a chart depicting one example of a status transition chart.

BEST MODE FOR CARRYING OUT THE INVENTION

General Construction

Figure 1:
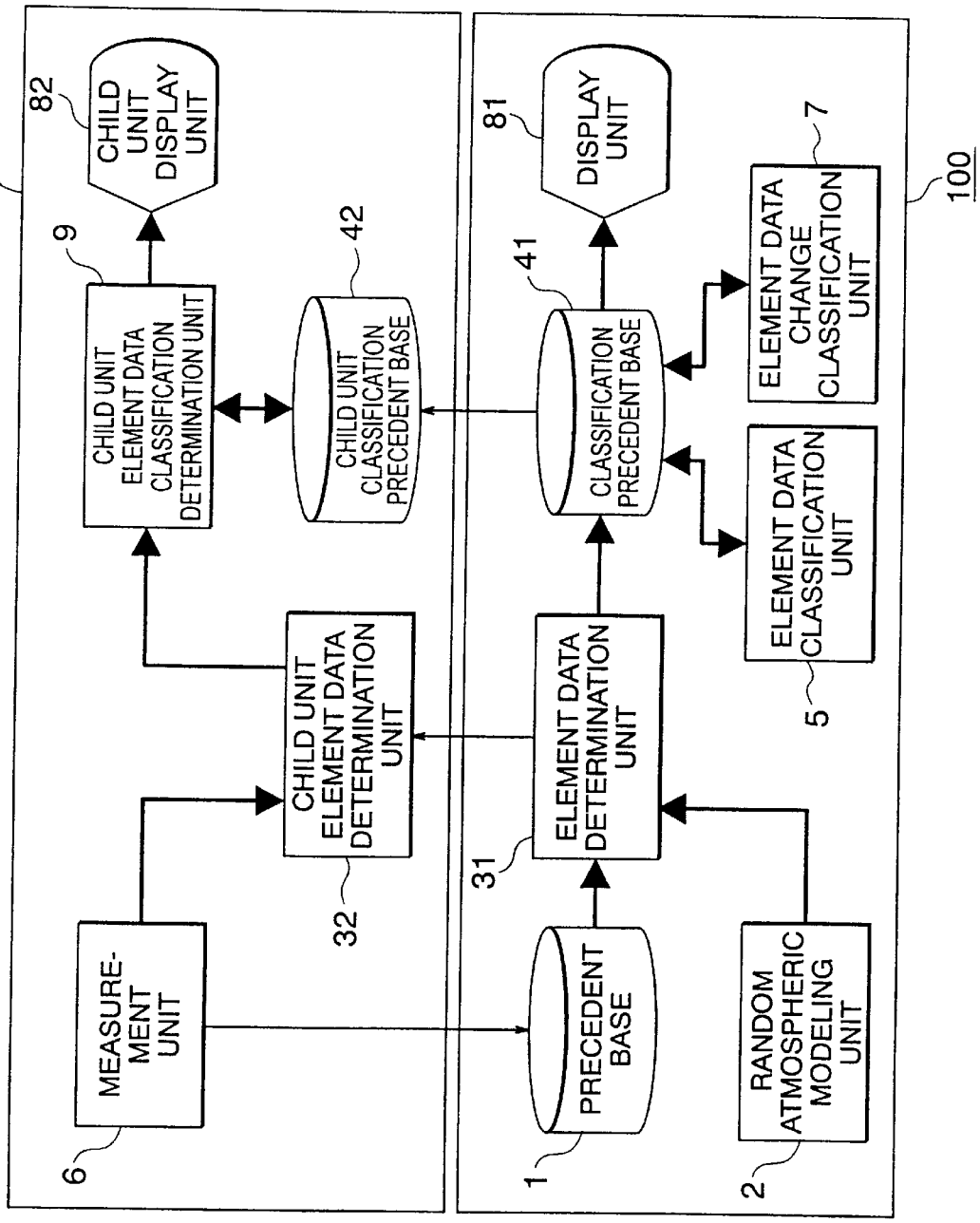
FIG. 1 is a block diagram depicting a general construction of an aircraft-mounted air turbulence warning system according to the present invention.

FIG. 1 is a block diagram depicting a general construction of an aircraft-mounted air turbulence warning system according to the present invention. In FIG. 1, a portion composed of a measuring unit 6, a child unit element data determination unit 32, a child unit classification precedent base 42, a child unit element data class determination unit 9 and a child unit display unit 82 illustrates a construction of a child unit 200 to be mounted on an aircraft.

On the other hand, a portion composed of a precedent base 1, a random atmospheric modeling unit 2, an element data determination unit 31, a classification precedent base 41, a element data classification unit 5, an element data change classification unit 7, and a display unit 81 illustrate a construction of a parent unit 100 for accumulating and classifying precedents measured by the child unit 200.

Between the parent unit 100 and the child unit 200, information exchange is performed at a unit for sending a portion of content from the classification precedent base 41 to the child unit classification precedent base 42, a unit having an element data determination format shared in common between the element data determination unit 31 and the child unit element data determination unit 32, and at a unit for sending measurement data from the measuring unit 6 to the precedent base 1.

Figure 2:
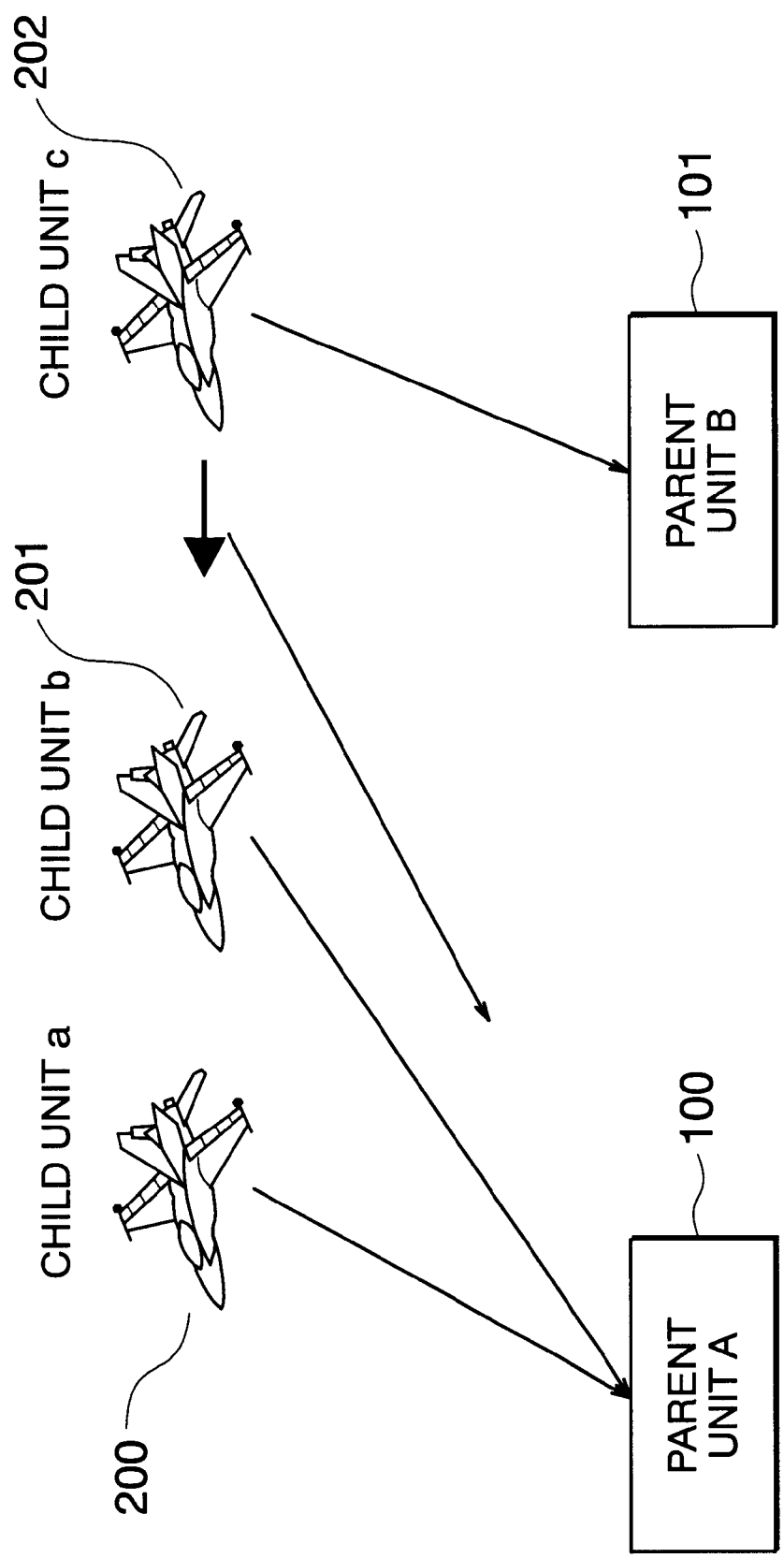
FIG. 2 is an explanatory diagram depicting a relationship between a parent unit and child units.

FIG. 2 is a diagram depicting a relationship between the parent unit 100 and the child unit 200. A parent unit A (100) and a parent unit B (101) are set at a fixed ground location, for example, at an airport, and they perform classification and the like of data pertaining to the vicinity of that fixed ground location. The child unit performs exchange of information with the closest parent unit. A child unit a (200) and a child unit b (201) perform information exchange with the parent unit A (100), and a child unit c (202) does so with the parent unit B (101). When the child unit moves, its information exchange partner changes. The child unit c (202) switches to exchange information with the parent unit A (100) at the point when it approaches the parent unit A (100).

The Measuring Unit

Figure 3:
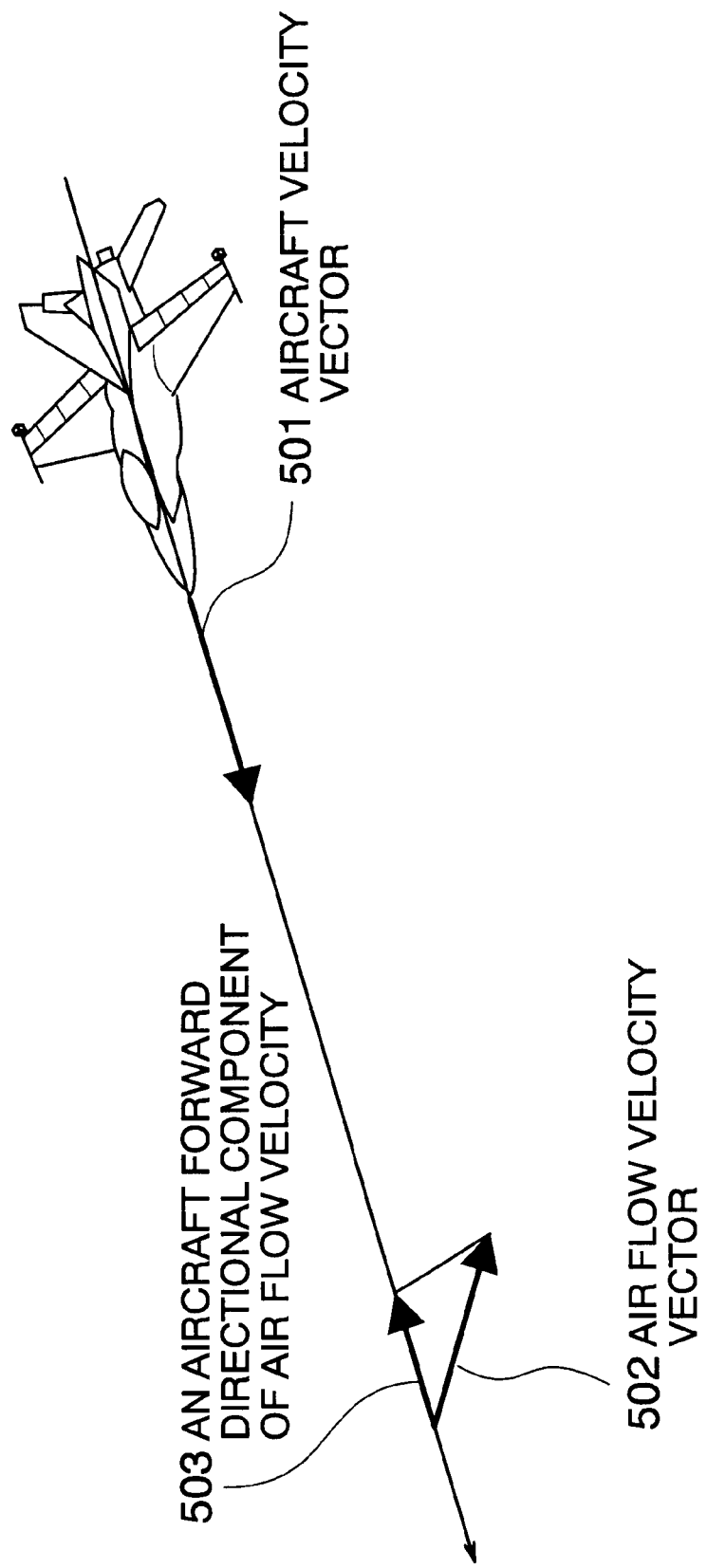
FIG. 3 is an explanatory diagram of a measured airflow velocity measured by a measurement unit.

At the measurement unit 6, a laser radar is used to take measurements regarding airflow in a vicinity surrounding the aircraft, for example within 5 km or 10 km ahead of the aircraft. It is desirable to record the results of the measurements in the measurement unit 6. The laser radar produces a relative measured value between the airflow and the aircraft (see the measured airflow velocity in FIG. 3). Further, temperature, humidity, and velocity of the surrounding airflow are measured using, for example, a thermometer, barometer and anemometer mounted on the aircraft. The above measurements are referred to generally as the airflow measurement results. Further, at the measurement unit 6 a determination is made as to whether or not the aircraft is encountering a dangerous turbulent flow for which a warning should be issued. It is also possible to make this determination using the judgement criteria mentioned above or based on whether the vibration or the acceleration of the aircraft has exceeded a reference value.

The airflow measurement results, the determination as to whether the aircraft is encountering air turbulence and the aircraft velocity vector, which have been obtained at the measurement unit 6 for each specific time and location, are notified to the child unit element data determination unit 32 and the precedent base 1 after adding thereto an aircraft identifier which is predetermined for each aircraft. The notification to the precedent base 1 of the parent unit 100 may be performed by radio communications whenever necessary or at regular intervals, for example.

The Precedent Base

The aircraft identifiers, times, locations, airflow measurement results and aircraft velocities which have been notified from the measurement units 6 of a plurality of child units 200 are accumulated at the precedent base 1. These are accumulated in a chart format such as is indicated by 701 of FIG. 4, for example.

The Random Atmospheric Modeling Unit

At the random atmospheric modeling unit 2, regional data from the vicinity surrounding the parent unit 100 mentioned-above is used to perform simulation of airflow according to a three-dimensional grid gas automaton method, for example. In this model a velocity vector and a location are set randomly for a mock aircraft, and this mock aircraft is made to perform a simulated flight. Simulatory measurement results that should be measured by the measurement unit of the child unit 200 if a child unit 200 were mounted on this mock aircraft are then generated. The results therefrom are outputted in a chart format such as is indicated by 701 in FIG. 4, for example.

The Element Data Determination Unit

The element data determination unit 31 receives a designation from the user designating a unit of the data to be handled (i.e., the element data) and the subject range thereof (i.e., rules for processing the element data). For example, the element data determination unit 31 receives a designation of a "position range", a "time frame", "attributes", a "window width", a "window interval" and a "window pattern", and records the content of the designations as rules for processing the element data.

The position range and the time frame designate the range scope which the parent unit 100 is to consider to be the element data.

The attributes designate types of attributes which compose the element data.

The window width designates the time frame which composes the element data.

The window interval designates the interval between time frames of the element data.

The window pattern is composed of a string of three values 0, + and −, and it is possible to make a plurality of designations in order corresponding to times within the windows.

At the element data determination unit 31, the data from the precedent base 1 or the data from the random atmospheric modeling unit 2 is processed and stored in the classification precedent base 41, according to the above designations.

FIG. 4 illustrates an example of a case in which the designation of the location range is 41°–43° latitude and 139°–141° longitude; the time frame is 15:40–15:43; the attributes are three attributes, "ambient humidity", "measured airflow velocity at 5 km ahead of the aircraft" and "measured airflow velocity 10 km in front of the aircraft"; the window width is 2; the window intervals are 2; and the window pattern is "+0" and "+−". Reference numeral 701 indicates data regarding the range of subject data, reference numeral 702 indicates the content of the designations and reference numeral 703 indicates the element data which has been created.

An example of a method for creating the element data is as follows. First, there is prepared a set of six values consisting of the three attribute values at the time 15:40 (i.e., corresponding to the window pattern "+0") plus three attribute values being equal to the attribute values at 15:40 minus the attribute values at 15:41 (i.e., corresponding to the window pattern "+−"). An attribute indicating as to whether the aircraft encountered air turbulence within the time and window range (i.e., a "air turbulence encounter" attribute) is attached to this set of six values, and this is considered to be the element data for the time 15:40. Next, in accordance with the window interval of two, the set of six attributes is calculated in the same way for the time 15:42, and this becomes the element data. It is desirable that the Walsh coefficient be used for the window pattern. In the case when the window width is 4, the Walsh coefficient would be equated to a window pattern of ++++, ++−−, +−−+, +−+− in this order, and a value obtained by further dividing the obtained value by the window width of 4 is used.

Further, at the element data determination unit 31, when the data is forwarded from the classification precedent base 41 to the child unit classification precedent base 42, the element data processing rules are also sent to the child unit element data determination unit at the same time.

The Classification Precedent Base

The classification precedent base 41 has the following functions.

The classification precedent base 41 holds the element data which has been extracted at the element data determination unit 31 in a chart format such as is illustrated by 703 in FIG. 4, and it hands over this element data in response to a request from the element data classification unit 5 or the display unit 81.

The classification precedent base 41 holds a correspondence chart as shown in FIG. 5 which is calculated at the element data classification unit 5, being for establishing correspondences between mixture distribution identifiers and mixture distribution parameters (hereinafter referred to as the mixture distribution chart), and it hands over this mixture distribution chart in response to a request from the child unit classification precedent base 42 or the display unit 81.

The classification precedent base 41 holds a correspondence chart as shown in FIG. 6 which is calculated at the element data change classification unit 7, being for establishing correspondences between the mixture distribution identifiers and the element data (hereinafter referred to as the change chart), and it hands over this change chart in response to a request from the display unit 81.

The classification precedent base 41 holds a corresponding chart as shown in FIG. 7 which is calculated at the element data change classification unit 7, being for establishing correspondences among the mixture distribution identifiers (hereinafter referred to as the status-transition chart), and it hands over.this status transition chart in response to a request from child unit classification precedent base 42 or the display unit 81.

The element data is deleted in accordance with designations from the display unit 81.

The Element Data Classification Unit

The following is performed at the element data classification unit 5 according to designations from the user or a predetermined execution plan.

The element data requested to the classification precedent base 41 is obtained.

Two element data aggregates are created based on the two attribute values written in the element data as to whether or not the aircraft has encountered air turbulence. The total number of each of the pieces of element data is recorded in the classification precedent base 41.

Figure 8:
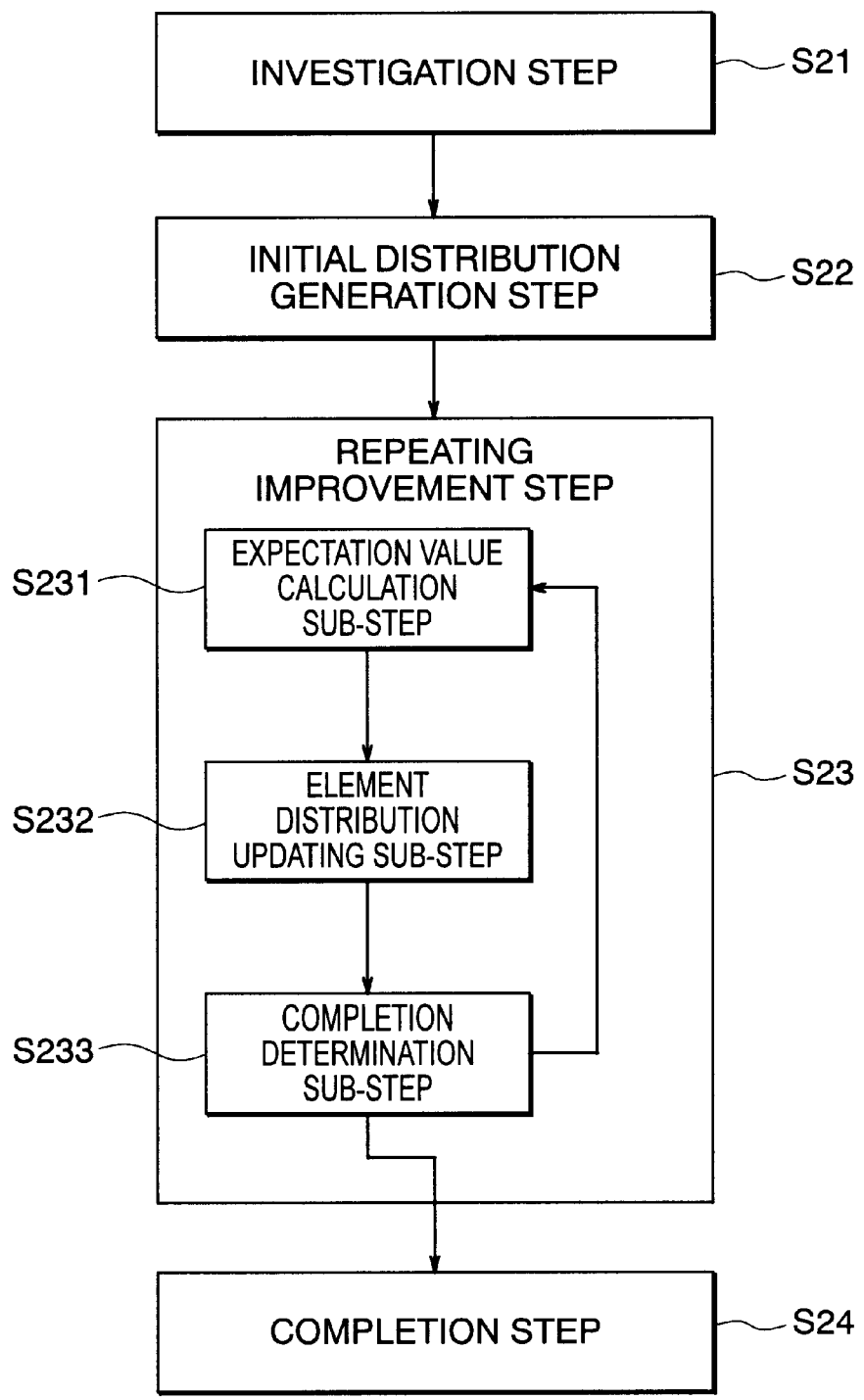
FIG. 8 is a flow chart depicting operations of an element data classification unit.

For each of the data aggregates a mixture distribution chart such as the one shown in FIG. 5 is created by following the following steps shown in FIG. 8, and these charts are recorded in the classification precedent base 41.

(Step S21)

At a subject range investigation step S21 in FIG. 8, the total number of element data is recorded into the classification precedent base and presented to the user, and the number of distributions to be mixed is received from the user. Additionally, the average, the variance, the number of the types of values and the total number of the values which are not null are investigated.

(Step 22)

At an initial distribution generation step S22, the initial distribution for element distribution, which have initial values for the element distributions such that the average values of the attributes are values which are mutually different from each other for the attributes having a predetermined number or more types of values, and for attributes having less than the predetermined number of types of values the average values are chosen from among the types of values; and for the variance, it is an appropriate number other than 0, is generated for the number equal to the number of classifications. For example, in the case when five classes are used for the classification, an average value of $\mu$ and a standard deviation of $\sigma$ are used and five values of $\mu-2\sigma$, $\mu-\sigma$, $\mu$, $\mu+\sigma$, and $\mu+2\mu$ become the average values of the initial element distributions, and $\sigma$ becomes the standard deviation for all of the initial element distribution. Further, in the case when the number of the kinds of values is 1, for example, the average value of the initial element distribution for that attribute is 0. Accordingly, it becomes possible to omit complex calculations and comparisons of probability density.

(Step S23)

At a repeating improvement step S23, the parameter combination, which is composed of the element distribution averages, the variances and the mixing proportion for each element distribution, is improved by means of repetition of sub-steps such as the ones shown in the box of S23 in FIG. 8. This repeating improvement ends when the parameter combination does not change during the course of the number of repetitions, or when the same parameter combination repeatedly appears a predetermined number of times, or when the number of repetitions has been executed a predetermined number of times.

(Step S231)

At an expectation value calculation sub-step S231 of the repeating improvement step S23, provisional data element averages, variances and mixing proportion for each of the data elements are used as a basis to calculate for each of the data elements. When the type of values that is given to an element distribution is 1 and the variance is thus 0, the probability densities other than that for the average value becomes 0, which causes defective operation of the areas where probability density ratios are used as the basis for determining proportion of contribution. Therefore, in the case when the variance of the element distribution is 0, a predetermined minute probability density is given to all the element data other than that for the average value, and a predetermined large probability density is given to the element data for the average value. A chart of values for functions for standard, normal distribution density functions having a predetermined degree of precision, in which the average is 0 and the variance is 1, is prepared for the calculation of the probability density in the case when the variance is not 0, and this chart is searched instead of calculating exponential functions every time, in order to obtain a value quickly. For example, in order to obtain the probability density of x in the normal distribution with the average value $\mu$ and the standard deviation $\sigma$, the chart of functions for the standard normal distribution density function is searched at the spot for $(x-\mu)/\sigma$ and a value is obtained by multiplying the value by $\sigma$. In the case when there is no such value in the chart, a proximate value is chosen and a value is produced by linear interpolation, for example.

(Step S232)

At an element distribution updating step S232, for each element data a probability density ratio is calculated for each provisional element distribution as proportion of contributions therefrom, for each element distribution the proportion of the contribution is multiplied by the values of each element data to obtain a value, the number of pieces of element data is obtained as a sum total of the contributions, and this value and this sum total are used as a basis for a new average and variance of provisional element distribution.

(Step S233)

At a completion determination sub-step S233, changes in the parameter combination of the provisional distribution are monitored, and the repeating improvement ends when the parameter combination does not change during the course of a predetermined number of repetitions, or when the same parameter combination repeatedly appears a predetermined number of times, or when the number of repetitions has been executed a predetermined number of times.

(Step S24)

At a completions step S24, the parameter combination which has been produced is recorded into the classification precedent base 41 together with an element distribution identifier of the element distribution as mixture distribution chart. FIG. 5 is an example of a multi-dimensional, non-correlative mixture distribution chart when the number of distributions mixed is 4. A mixing proportion, an average and a variance of each attribute is recorded for each mixture distribution identifier indicating whether or not the aircraft has encountered air turbulence.

The Element Data Change Classification Unit

The element data change classification unit 7 has the following functions.

The element data change classification unit 7 determines which of the following two element distributions the element data stored in the classification precedent base 41 should belong to: a) the element distributions belonging to the mixture distribution of the case when the aircraft has encountered air, and b) the element distributions belonging to the mixture distribution of the case when the aircraft has not encountered air turbulence, which are stored in the classification precedent base 41 and this determination is recorded in a change chart and stored in the classification precedent base 41. For example, the element data change classification unit 7 can select the element distribution in which the product of the probability density of the element data and the mixing proportion of the element distribution is the greatest. In the case when the same value exists more than once, the element data change classification unit 7 can give priority rankings to all of the identifiers and select the one with the highest priority ranking. FIG. 6 is an example of the change chart. In the element data chart indicated by 703 in FIG. 4, a line of mixture distribution identifiers is added.

Based on the change chart stored in the classification precedent base 41, the changes in the mixture distribution identifier for each aircraft identifier are obtained, and the transition probability among the element distributions is calculated, recorded in the status transition chart and stored in the classification precedent base 41. For example, the changes in the mixture distribution identifier of two chronologically adjacent pieces of element data (i.e., having an interval of 0) are collected and obtained and a status transition chart is created. Also, the changes in the mixture distribution identifier of two pieces of element data having one element data between them chronologically (i.e., having an interval of 1) are collected and obtained and a status transition chart is created. Thereafter the number of element data corresponding to the time interval between the two pieces of element data is successively increased to 10 and a total of eleven status transition charts are created. FIG. 7 is an example of the status transition chart. Chart 1001 is the status transition chart for the interval of 0, and chart 1002 is the status transition chart for the interval of 1.

The Display Unit

The display unit 81 has the following functions.

The display unit 81 displays the mixture distribution chart, the change chart and the status transition charts which are accumulated in the classification precedent base 41 to the user in response to a request.

The display unit 81 receives delete instructions from the user to delete element data accumulated in the classification precedent base 41, and notifies the classification precedent base 41 designations of element data which should be deleted and the deletion instructions.

The Child Unit Element Data Determination Unit

The child unit element data determination unit 32 obtains the element data processing rules from the element data determination unit 31, and processes data obtained from the measurement unit 6 according to these rules and outputs the data to the child unit element data classification determination unit 9. An example of the element data processing rules obtained from the element data determination unit 31 is indicated by 702 in FIG. 4. The format for creating the element data is the same as the format in the element data determination unit 31.

The Child Unit Classification Precedent Base

The child unit classification precedent base 42 requests and obtains the mixture distribution chart such as the one shown in FIG. 5 and the status transition chart such as the one shown in FIG. 7 from the classification precedent base 41, and provides the mixture distribution chart and the status transition chart according to a request from the child unit element data classification determination unit 9.

The Child Unit Element Data Classification Determination Unit

The child unit element data classification determination unit 9 makes reference to the mixture distribution chart which is stored in the child unit classification precedent base 42, determines which of the element distributions represented in the mixture distribution chart the each element data processed by the child unit element data determination unit 32 should belong to, and informs a child unit display unit 82 of the element distribution identifier to which it determined that the element data should belong. For example, the element distribution in which the product of the probability density of the element data in each element distribution and the mixing proportion for the element distribution is the greatest is selected as the element distribution to which the data element should belong. In the case when the same value exists more than once, priority rankings can be given to all of the identifiers and select the one with the highest priority ranking. Additionally, reference is made to the status transition charts stored in the child unit classification precedent base 42 regarding a plurality of time intervals, the transition probability with respect to each of the time intervals elapsing from the above element distribution to all of the element distributions is obtained and this transition probability is notified to the child unit display unit 82. Additionally, a probability of encountering air turbulence with respect to each time interval elapsed is calculated from this transition probability and whether or not air turbulence has been encountered in the case of the above mixture distribution chart and this is notified to the child unit display unit 82. For example, the probability of encountering air turbulence for each time interval elapsed may be the sum total of the product of the air turbulence encountering probability in each element distribution and the transition probability with respect to the each time period elapsed toward the element distribution.

The Child Unit Display Unit

The child unit display unit shows to the user the classification element distribution obtained from the child unit element data classification determination unit 9, the transition probabilities from that element distribution to all of the element distributions, and the air turbulence encounter probability for each elapsed time interval, and issues the warning in the case when the air turbulence encounter probability satisfies a condition set in advance by the user. For example, as such a condition, the user may make a setting in advance for the following: the air turbulence encounter probability exceeds 80% in interval 9 and interval 10, or the air turbulence encounter probability exceeds 90% in interval 7 or interval 8, or it exceeds 95% in all of the intervals. When such settings are made, the warning is issued in accordance with the conditions.

General Operations

There are four operation sequences, a data collection sequence, a data determination sequence, a data adding sequence and a data transmission sequence. The data collection sequence, the data determination sequence and the data transmission sequence are executed independently and in parallel fashion per aircraft. The data adding sequence is executed as needed by the parent unit 100. For example, the parent unit 100 performs the data adding sequence every day on a regular basis. The child unit 200 performs the data transmission sequence at most one time per day or performs it at least before the flight of the aircraft on which it is mounted flies, and during flight the child unit 200 performs the data adding sequence and the data determination sequence continuously on a regular basis.

The Data Collection Sequence

This is performed by the measurement unit 6, and the data produced by this is notified to the precedent base 1.

The Data Determination Sequence

This is performed by the measurement unit 6; the data produced by this is processed and turned into element data by the child unit element data determination unit 32; the child unit element data classification determination unit 9 references the child unit classification precedent base 42 and determines the classification to which the element data belongs; and the child unit display unit 82 displays the classification to which the element data belongs, the transition probability for each classification and the air turbulence encounter probability and issues the warning for air turbulence in the case when predetermined conditions are satisfied.

The Data Summing Sequence

In this sequence, the data accumulated in the precedent base 1 and the data obtained by the random atmospheric modeling unit 2 are processed and turned into element data by the element data determination unit 31 and recorded into the classification precedent base 41; this element data is classified by the element data classification unit 5; the element data change classification unit 7 determines which classification the each element data is to belong; and transition probabilities across the classifications are calculated and stored in the classification precedent base 41. The information stored in the classification precedent base 41 is displayed on the display unit 81, the user uses this as a basis to designate deletion of a part of the element data to the classification precedent base 41, and reclassification instructions are made to the element data classification unit 5 and to the element data change classification unit 7 respectively.

The Data Transmission Sequence

In this sequence the element data processing rules being stored at the element data determination unit 31 are notified to the child unit element data determination unit 32, and the classification chart and the status transition charts being stored at the classification precedent base 41 are notified to the child unit classification precedent base 42, respectively.

Basic Parent and Child Type

As described above, in this embodiment of the aircraft-mounted air turbulence warning system, there is provided a system for collecting airflow data by using a measuring device mounted on an aircraft and for predicting air turbulence and issuing a warning therefor based on this data, the system being composed of with:
a parent unit 100 having:
  a precedent base 1 for accumulating airflow data notified from each of the measurement units 6 in a plurality of child units 200, namely an aircraft position, a velocity vector, airflow measurements results and results of a determination as to whether the aircraft is encountering air turbulence;

an element data determination unit 31 for receiving from the user a designation of element data and a designation of a range that is to be the subject of the processing based on the data accumulated in the precedent base 1 and processing the data in the precedent base 1 according to these designations, and recording the data in the classification precedent base 41;

an element data classification unit 5 for requesting and obtaining the element data from the classification precedent base 41, creating an aggregation of element data based on results, which are written in the element data, of a determination as to whether the aircraft is to encounter air turbulence, recording into the classification precedent base the total number of element data and creating a classification chart by classifying the each of the element data into a predetermined number of classes and recording this in the classification precedent base 41;

an element data change classification unit 7 for determining which classification accumulated in the classification precedent base 41 each element data belongs to and describing this as a change chart in the classification precedent base 41, and based on this change chart, summing changes of a classification identifier of each aircraft classification identifier, and calculating a transition probabilities among the classifications and describing these as a status transition chart in the classification precedent base 41;

a classification precedent base 41 for storing the element data, the classification chart, the change chart and the status transition chart, and displaying these in response to a request from a child unit classification precedent base 42 and a display unit 81 and deleting the element data according to a designation from the display unit; and a display unit 81 for displaying the mixture distribution chart, the change chart and the status transition chart to the user, along with receiving a designation from the user to delete the element data;

and the child unit 200 having:
  a measurement unit 6 for performing measurements of the air current surrounding the aircraft, making a determination as to whether the aircraft is encountering air turbulence such that the warning should be issued, and notifying the results of the position and the velocity vector of the aircraft, the air current measurement results, and this air turbulence encounter determination to the precedent base 1;
  a child unit element data determination unit 32 for obtaining the designation of the element data and the subject range from the element data determination unit 31, processing the data obtained from the measurement unit 6 in accordance with the designations and outputting this to the child unit element data classification determination unit 9;
  the child unit element data classification determination unit 9 for referencing a mixture distribution chart being stored in the child unit classification precedent base 42, determining which element distribution in the mixture distribution chart each of the element data processed by the child unit element data determination unit 32 belongs to and informing a child unit display unit 82 of an element distribution identifier which it has determined; and also, referencing the status transition chart recorded in the child unit classification precedent base 42, obtaining the transition probabilities from the element distribution to all of the element distributions, informing the child unit display unit 82 of these transition probabilities, calculating a probability of encountering air turbulence based on the transition probability and based on whether or not the mixture distribution chart indicates an air turbulence encounter and informing this probability of encountering air turbulence to the child unit display unit 82;

the child unit classification precedent base 42 for making a request to the classification precedent base 41 and obtaining the classification chart and the status transition chart, and providing these according to a request from the child unit element data classification determination unit 9; and the child unit display unit 82 for displaying to the user the class element distribution obtained from the child unit element data classification determination unit 9, the transition probabilities from the element distribution to all of the element distributions and the probability of encountering air turbulence, and issuing a warning in the case when the probability of encountering air turbulence satisfies conditions determined in advance by the user; in which the operations thereof are composed of the following:

a data collection sequence, in which measurement is performed by the measurement unit 6 and the data produced by this is notified to the precedent base 1;

a data determination sequence, in which measurement is performed by the measurement unit 6 and the data produced by this is processed and turned into element data by the child unit element data determination unit 32, the child unit element data classification determination unit 9 references the child unit classification precedent base 42 and determines the classification to which the element data belongs, and the child unit display unit 82 displays the classification to which the element data belongs with the result that the air turbulence warning is issued;

a data summing sequence, in which the data accumulated in the precedent base 1 are processed and turned into element data by the element data determination unit 31 and stored in the classification precedent base 41, this element data is classified by the element data classification unit 5, the element data change classification unit 7 determines which classification each of the element data is to belong, and the element data change classification unit 7 calculates transition probabilities among the classifications and stores this in the classification precedent base 41, the information stored in the classification precedent base 41 is displayed on the display unit 81, the user uses this as a basis to designate deletion of a part of the element data to the classification precedent base 41, and reclassification instructions are made to the element data classification unit 5 and to the element data change classification unit 7 respectively; and a data transmission sequence in which the element data processing rules stored in the element data determination unit 35 is notified to the child unit element data determination unit 32, and the classification chart as well as the status transition chart stored in the classification precedent base 41 are notified to the child unit classification precedent base 42, in which the data collection sequence, the data determination sequence and the data transmission sequence mentioned above are executed independently and in parallel fashion per each aircraft, and the data collection sequence is executed by the parent unit as necessary.

Accordingly, by using the accumulation of actual data as a basis for constructing of models based on data classification, selecting a model based on a determination as to which classification each data belongs to and performing predictions of air turbulence in a parallel fashion, it becomes possible to predict and issue a warning about air turbulence even in the case when the airflow model is not clearly specified in advance, which could not be predicted by the method of the conventional technology described above.

Padding Precedent Examples by Using a Random Simulator

Further, there is provided a random atmospheric modeling unit for performing a simulation of airflow by using regional data from the vicinity surrounding the parent unit, randomly setting a velocity vector and a position for a mock aircraft in this simulation and making this mock aircraft perform a mock flight, generating mock measurement results which should be measured by the measurement unit of the child unit in the case when the child unit were mounted on the mock aircraft and notifying these results to the element data determination unit, and the element data determination unit receives not only the data from the precedent base but also from the random atmospheric modeling unit.

In the data summing sequence the element data determination unit processes not only the data from the precedent base but also the data from the random atmospheric modeling unit and turns the data into the element data.

Accordingly, even at the stage when the actual data accumulation is insufficient, the air current simulator is used to artificially increase the precedent examples, whereby it becomes possible to predict air turbulence and issue a warning therefor.

Using Mixture Distribution for the Classification

Further, classification is performed by assuming a mixture distribution made up of a plurality of distributions and estimating the mixing proportions and the parameters of each distribution (hereinafter referred to as, "element distributions") (hereinafter, these parameters are referred to generally as "mixture distribution parameters"); and accordingly, the classification precedent base accumulates correspondences between the mixture distribution parameters and the element identification identifiers, and correspondences between the element distribution identifiers and element data;

the element data classification unit receives a number of distributions assumed to be mixed (i.e., a mixture number) from the user, obtains mixture distribution parameters by assuming a mixture distribution made up of the mixture number of element data, and records in the classification precedent, base (41) correspondences between the mixture distribution identifiers and the mixture distribution parameters; and the child unit element data classification determination unit determines which element distribution the element data belongs to, and records in the classification precedent base the correspondences between the element data and the identifier of the element distribution to which the element data belongs.

Accordingly, by adopting a classification format based on a mixture distribution model, it becomes easy to reduce to practice a classification having flexible boundaries by means of using probabilities, which are a general standard for evaluation.

Using Multi-dimensional, Non-correlative Mixture Distribution for the Classification Additionally, a multi-dimensional normal distribution having no covariance component is used as the element distribution, and based on a mixture distribution made up of a predetermined number of element distributions being added with weights, parameters for the mixture distribution are obtained and correspondences between the mixture distribution identifiers and the mixture distribution parameters are recorded in the classification precedent base 41;

the element data change classification unit 7 makes each element data belong to that element distribution in which the product of the probability density of the element data of that element distribution and the mixing proportion of that element distribution is the greatest of all the element distributions; and the element data classification unit 5 performs the following steps of:

a subject range investigation step S21 in which an average, a variance, a number of types of values and a total number of values which are not null values are investigated with respect to each attribute;

an initial distribution generation step S22 in which the initial distribution for element distribution having initial values such that the average values of the attributes are to be average values which are mutually different from each other with respect to the items being measured for which there are a predetermined number or more of types of values, and for measured items having less than the predetermined number of types of values, the average values are chosen from among the types of values, and for the variance, it is an appropriate number such as a number other than 0, is generated for a number equal to the number of classifications;

a repeating improvement step S23 having an expectation value calculation sub-step S231, in which provisional averages, variances and mixing proportions for each of the element distributions are used as a basis to calculate probability density for each of the element data; an element distribution updating sub-step S232, in which for each element data a probability density ratio is calculated for each provisional element distribution and is set as a proportion of contribution therefrom, for each element distribution the proportion of contribution is multiplied by the values of each element data to obtain a value, the number of pieces of element data is obtained as a sum total of the proportions of contribution, and the above value and this sum total are used as a basis for a new average and variance for the provisional element distribution; and a completion determination sub-step S233, in which changes in the parameter combinations of the provisional distribution are monitored, and the repeating improvement ends when the parameter combination does not change during the course of the number of repetitions, or when the same parameter combination repeatedly appears a predetermined number of times, or when the number of repetitions has been executed a predetermined number of times; and a completion step S24, in which the parameter combination which has been obtained is recorded into the classification precedent base together with an element distribution identifier; and the element data classification unit 5 operates by executing the above subject range investigation step S21, the initial distribution generation step S22, the repeating improvement step S23 and the completion step 24 in the stated order.

Accordingly, by adopting a classification format in which the element distribution is a multi-dimensional normal distribution having no covariance component, it becomes possible for the probability density calculation, which is the calculation for the classification, to be calculated quickly and simply by means of a product of values in a single dimension.

Embodiment 2

Figure 9:
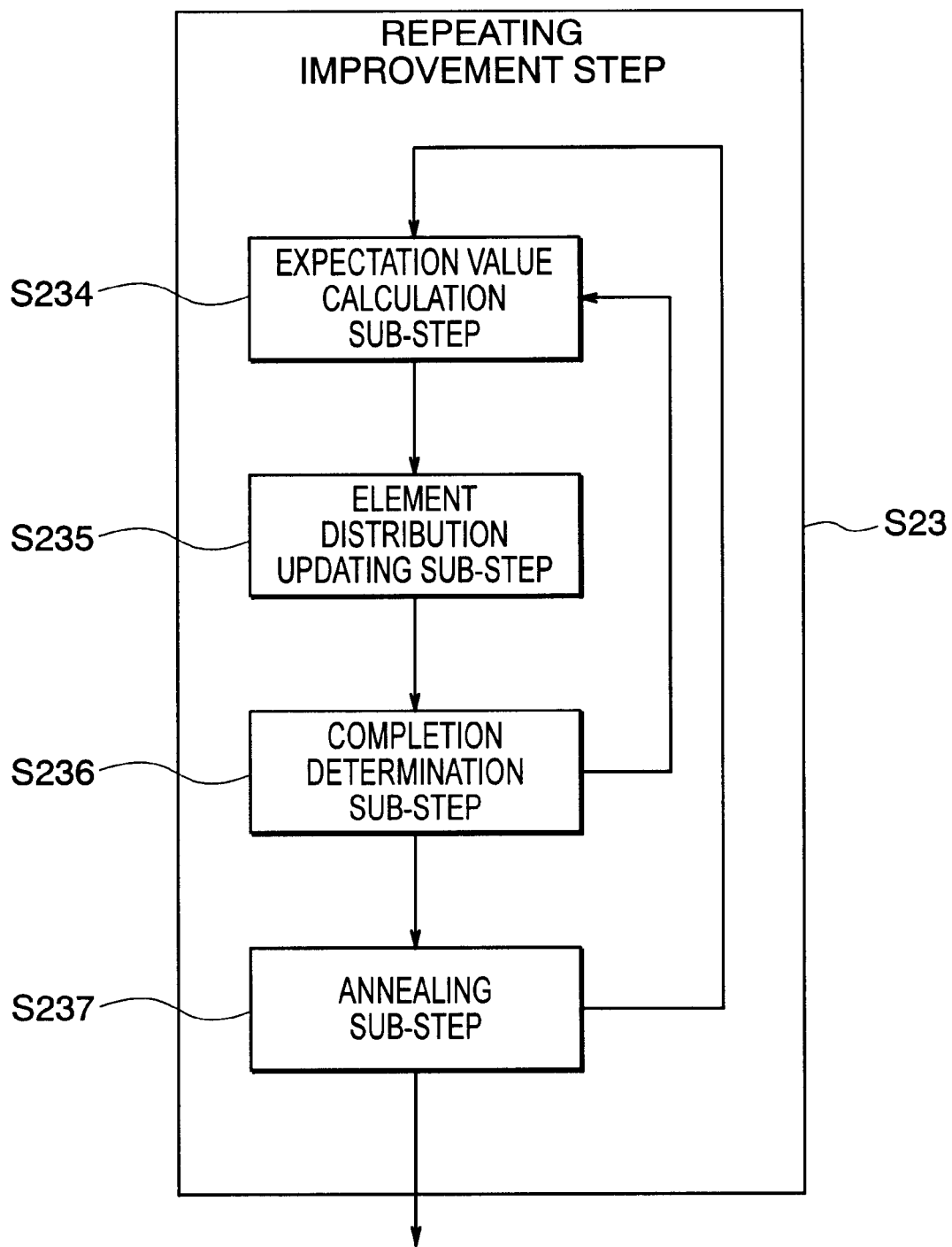
FIG. 9 is a flow chart depicting a flow of an operation of a repeating improvement step of the element data classification unit.
Figure 10:
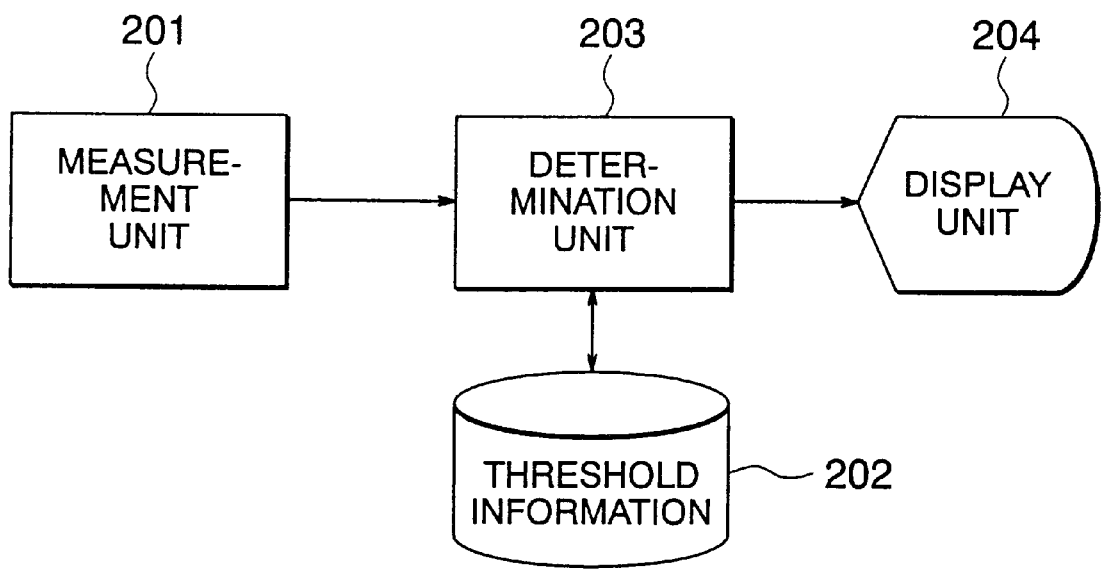
FIG. 10 is a block chart depicting a conventional aircraft-mounted air turbulence warning system.

The present embodiment improves the operation of the repeating improvement step S23 in FIG. 8 which depicts operations of the element data classification unit 5 of FIG. 1 of Embodiment 1. FIG. 9 depicts the improved points.

In the present embodiment, parameter combinations of the average, the variance of element distribution and the mixing proportion among element distributions at the repeating improvement step S23 in FIG. 8 are improved by means of repetition of a sub-step such as the one depicted in FIG. 9. For the outer side of the repetition, an annealing parameter greater than 0 and equal to or less than 1 (hereinafter indicated as "a") is prepared and reference is made thereto, and when "a" becomes a value that that has been determined in advance the repeating improvement ends. For example, "a" is a real number value between 0.5 and 1.0 and it changes with each repetition by an amount which is determined in advance, and when it becomes 1.0 the repeating improvement finishes. The inside repetition ends when the element distribution parameter combination does not change for a predetermined number of repetitions, or when the same parameter combination repeatedly appears a predetermined number of times, or when the number of repetitions has been executed a predetermined number of times.

(Step S234)

At an expectation value calculation sub-step S234, provisional averages, variances and mixing proportions for each of element distributions are used as a basis to calculate probability density for each of the element data. When the value type that contributes to an element distribution is 1 and the variance is thus 0, the probability density other than that for the average becomes 0, which causes defective operation of areas where the probability density ratio is used as a basis for determining contribution proportion of each element data. Therefore, in the case when the variance of the element distribution is 0, a predetermined minute probability density is given to all the element data other than that for the averages, and a predetermined large probability density is given to the element data for the averages. A chart of values for functions for standard, normal distribution density functions having a predetermined degree of precision, in which the average is 0 and the variance is 1, is prepared for the calculation of the probability density in the case when the variance is not 0, and this chart is searched instead of calculating exponential functions every time, in order to obtain a value quickly. In the case when there is no such value in the chart, a proximate value is chosen and the value of interest is produced by linear interpolation, for example. This value is raised to the "a"th power and recorded.
(Step S235)

At an element distribution updating step S235, for each element data, the ratio among the "a"th power of the probability densities for each provisional distribution, which was recorded at the expectation value calculation sub-step S1, is calculated and used as a basis for determining contribution proportion of each element data, and for each distribution the contribution proportion is multiplied by the values of each element data to obtain a value, the number of pieces of element data is obtained as a sum total of the proportions of contribution, and the above value and this sum total are used as a basis for a new average and variance of provisional element distribution.
(Step S236)

At a completion determination sub-step S236, changes in the parameter combination of the provisional distribution are monitored, and the repeating improvement of the inside ends when the parameter combination does not change during the course of the number of repetitions, or when the same parameter combination repeatedly appears a predetermined number of times, or when the number of repetitions has been executed a predetermined number of times.
(Step S237)

At an annealing sub-step S237, the value of "a" is increased by increments of a predetermined size or by a predetermined ratio, for example, and the procedure following the expectation value calculation sub-step S1 is repeated and the outer side repetition stops when a becomes 1 or greater.

Using Definite Annealing EM Method for the Classification

As described above, in this embodiment of the aircraft-mounted air turbulence warning system, the repeating improvement step S23 in the operation of the element data classification unit is composed of:

an expectation value calculation sub-step S234, in which provisional averages, variances and mixing proportions for each of element distributions are used as a basis to calculate probability density for each of the data elements, an annealing parameter greater than 0 and equal to or less than 1 (hereinafter indicated as "a") is used to record the "a" th power of the probability density;

an element distribution updating sub-step S235, in which for each element data, ratio among the "a"th power of the probability densities for each provisional element distribution recorded in the expectation value calculation sub-step S234 is calculated and this is used as a basis for determining the proportion of contribution, for each element distribution the contribution proportion is multiplied by the values of each element data to obtain a value, the number of pieces of element data is obtained as a sum total of the contribution proportions and the above value and this sum total are used as a basis for a new average and variance for the provisional element distribution;

a completion determination sub-step S236, in which changes in the parameter combinations of the provisional distribution are monitored, and the repetition of the annealing parameter ends when the parameter combination does not change during the course of the number of repetitions, or when the same parameter combination repeatedly appears a predetermined number of times, or when the number of repetitions has been executed a predetermined number of times; and an annealing sub-step S237, in which the outer side of the repetition is ended in the case when the value "a" is incremented in accordance with a predetermined plan, the procedure subsequent to the expectation value calculation sub-step S234 is repeated and "a" has become equal to or greater than 1; and the expectation value calculation sub-step S234, the element distribution updating sub-step S235, the completion determination sub-step S236 and the annealing sub-step S237 are executed in the stated order.

Accordingly, by using the annealing of the distribution function for the probability density as the format for determining the mixture distribution parameters, it becomes possible to achieve a stable determination of parameters which does not depend on the initial values.

INDUSTRIAL APPLICABILITY

In an aircraft-mounted air turbulence warning system according to the present invention, there is provided a system for collecting air current data by using a measuring device mounted on an aircraft and for predicting air turbulence based on this data and issuing a warning therefor, the system being provided with:

a parent unit having:
a precedent base for accumulating data notified from a plurality of child units;
an element data determination unit for processing the data in the precedent base and turning it into element data based on a predetermined designation of a range that is subject to this processing;
an element data classification unit for creating an aggregation of element data based on results, which are written in the element data in the classification precedent base, of a determination as to whether the aircraft is to encounter air turbulence, classifying each element data aggregation and creating a classification chart and recording this in the classification precedent base;
an element data change classification unit for determining which classification the element data in the classification precedent base belongs to and describing this as a change chart in the classification precedent base, and based on this change chart, summing changes of a classification identifier of each classification identifier, and calculating a transition probabilities among the classifications and describing these probabilities as a status transition chart in the classification precedent base;
a classification precedent base for storing the element data, the classification chart, the change chart and the status transition chart; and
a display unit for displaying the element data, the change chart and the status transition chart;
and the child unit having:
a measurement unit for collecting the air current data and notifying the data to the precedent base;
a child unit element data determination unit for processing data collected by the measurement unit based on the subject range that was designated as being the subject of the processing and turning it into the element data, and outputting this to a child unit element data classification determination unit;

the child unit element data classification determination unit for referencing a mixture distribution chart in the child unit classification precedent base, determining which element distribution in the mixture distribution chart each element data processed by the child unit element data determination unit belongs to and informing a child unit display unit of an element distribution identifier which it has determined; and also, referencing the status transition chart, obtaining the transition probabilities from an element distribution to all of the element distributions, notifying the child unit display unit of these transition probabilities, calculating a probability of encountering air turbulence based on the transition probability and based on whether or not the mixture distribution chart indicates an air turbulence encounter and informing this probability of encountering air turbulence to the child unit display unit;

the child unit classification precedent base for making a request to the classification precedent base and obtaining the classification chart and the status transition chart, and providing these according to a request from the child unit element data classification determination unit; and the child unit display unit for displaying the class element distribution, the transition probability and the probability of encountering air turbulence obtained from the child unit element data classification determination unit, and issuing a warning in the case when the probability of encountering air turbulence satisfies predetermined conditions.

Accordingly, using the accumulation of actual data as a basis for constructing of models based on data classification, selecting a model based on a determination of which classification data belongs to and performing predictions of air turbulence in a parallel fashion, it becomes possible to predict and issue a warning about air turbulence even in the case when the airflow model is not clearly specified in advance, which could not be predicted by the method of the conventional technology described above.

Further, there is further provided a random atmospheric modeling unit for using regional data from the vicinity surrounding the parent unit to perform a simulation of airflow, randomly setting a velocity vector and a position for a mock aircraft in this simulation and making this mock aircraft perform a mock flight, generating mock measurement results which should be measured by the measurement unit of the child unit in the case when the child unit were mounted on the mock aircraft and notifying these results to the element data determination unit, and in which the element data determination unit processes the data from the precedent base and the random atmospheric modeling unit in accordance with a predetermined subject range that was designated as the subject of this processing and turns the data into the element data, and records this in the classification precedent base.

Accordingly, even at the stage when the actual data accumulation is insufficient, the air.current simulator is used to artificially increase the precedent examples, thereby making it possible to predict air turbulence and issue a warning therefor.

Further, classification is performed by assuming a mixture distribution made up of a plurality of distributions and estimating the mixing proportions and the mixture distribution parameters of element distributions; and in which the classification precedent base accumulates correspondences between the mixture distribution parameters and the element distribution identifiers, and correspondences between the element distribution identifiers and the element data;

the element data classification unit inputs the assumed number of distributions to be mixed, and assuming a mixture distribution of element data obtained in accordance with the mixture number, obtains mixture distribution parameters and records in the classification precedent base correspondences between the mixture distribution identifiers and the mixture distribution parameters; and the child unit element data classification determination unit determines which element distribution the element data belongs to, and records in the classification precedent base correspondences between the element data and the element distribution identifiers corresponding to the element data.

Accordingly, by adopting a classification format using a mixture distribution model, it becomes easy to reduce to practice a classification having flexible boundaries by means of using probabilities, which are a general standard for evaluation.

Further, the element distribution is a multi-dimensional normal distribution having no covariance component, and the mixture distribution parameters are sought for a mixture distribution made up of a predetermined mixture number of element distributions being added with weights, and correspondences between the mixture distribution identifiers and the mixture distribution parameters are recorded in the classification precedent base; and the element data change classification unit makes each element data belong to the element distribution in which the product of the probability density of the element data of that element distribution and the mixing proportion of that element distribution is the greatest of all the element distributions; and the element data classification unit performs the following steps of:

a subject range investigation step in which an average, a variance, a number of types of values and a total number of values which are not null values are investigated with respect to each attribute;

an initial distribution generation step in which the initial distribution for element distribution having initial values such that the average values of the attributes are to be average values which are mutually different from each other with respect to the items being measured for which there are a predetermined number or more of types of values, and for measured items having less than the predetermined number of types of values, the average values are chosen from among the types of values, and for the variance, it is an appropriate number such as a number other than 0, is generated for a number equal to the number of classifications;

a repeating improvement step having an expectation value calculation sub-step, in which provisional averages, variances and mixing proportions for each of the element distributions are used as a basis to calculate probability density for each of the element data; an element distribution updating sub-step, in which for each element data a probability density ratio is calculated for each provisional element distribution and this is used as a basis for determining proportion of contribution therefrom, for each element distribution the contribution proportion is multiplied by the values of each element data to obtain a value, the number of pieces of element data is obtained as a sum total of the contribution proportions and the above value and this sum total are used as a basis for a new average and variance for the provisional element distribution; and a completion determination sub-step, in which changes in the parameter combinations of the provisional distribution are monitored, and the repeating improvement ends when the parameter combination does not change during the course of the number of repetitions, or when the same parameter combination repeatedly appears a predetermined number of times, or when the number of repetitions has been executed a predetermined number of times; and a completion step, in which the parameter combination which has been obtained is recorded into the classification precedent base together with an element distribution.

Accordingly, by adopting a classification format in which the element distribution is a multi-dimensional normal distribution having no covariance component, it becomes possible for the probability density calculation necessary for the classification to be performed quickly and simply by means of a product of values in a single dimension.

Additionally, the repeating improvement step comprises the following steps of:

an expectation value calculation sub-step, in which provisional averages, variances and mixing proportions for each of the element distributions are used as a basis to calculate probability density for each of the element data, an annealing parameter greater than 0 and equal to or less than 1 is used to record the density function raised to the power of the annealing parameter;

an element distribution updating sub-step, in which for each element data the ratio among the probability densities having been raised to the power of the annealing parameter and recorded in the expectation value calculation sub-step is calculated for each provisional element distribution and this is used as a basis for determining the proportion of contribution therefrom, for each element distribution the proportion of contribution is multiplied by the values of each element data to obtain a value, the number of pieces of element data is obtained as a sum total of the contribution proportions and this value and this sum total are used as a basis for a new average and variance for the provisional element distribution;

a completion determination sub-step, in which changes in the parameter combinations of the provisional distribution are monitored, and the repetition of the annealing parameter ends when the parameter combination does not change during the course of the number of repetitions, or when the same parameter combination repeatedly appears a predetermined number of times, or when the number of repetitions has been executed a predetermined number of times; and an annealing sub-step, in which the outer side of the repetition is ended in the case when the value of the annealing parameter is increased in accordance with a predetermined plan, the procedure subsequent to the expectation value calculation sub-step is repeated and the annealing parameter has become equal to or greater than 1.

Accordingly, by using the annealing of the distribution function for the probability density as the format for determining the mixture distribution parameters, it becomes possible to achieve a stable determination of parameters which does not depend on the initial values.

What is claimed is:

1. An aircraft-mounted air turbulence warning system for collecting air current data by using a measuring device mounted on an aircraft and for predicting a turbulent air current based on this data and issuing a warning, said aircraft-mounted air turbulence warning system comprising:

a parent unit having:

a precedent base for accumulating data notified from a plurality of child units;

an element data determination unit for processing the data in the precedent base, turning it into element data based on a predetermined designation of a range that is subject to this processing, and storing the element data in a classification precedent base;

an element data classification unit for creating an aggregation of element data based on results, which are written in the element data in the classification precedent base, of a determination as to whether the aircraft is to encounter air turbulence, classifying each element data aggregation to create a classification chart and recording this in the classification precedent base;

an element data change classification unit for determining which classification the element data in the classification precedent base belongs to and describing this as a change chart in the classification precedent base, and based on this change chart, summing changes of a classification identifier of each aircraft classification identifier, and calculating transition probabilities among the classifications and describing these as a status transition chart in the classification precedent base;

a display unit for displaying the change chart and the status transition chart; and wherein the classification precedent base stores the element data, the classification chart, the change chart and the status transition chart;

and a child unit having:

a measurement unit for collecting the air current data and notifying the data to the precedent base;

a child unit element data determination unit for processing data collected by the measurement unit based on the range that was designated as being the subject of the processing and turning it into the element data, and outputting this to a child unit element data classification determination unit;

wherein the child unit element data classification determination unit references a mixture distribution chart in the child unit classification precedent base, determining which element distribution in the mixture distribution chart each of the element data processed by the child unit element data determination unit should belong to and informing a child unit display unit of an element distribution identifier which it has determined; and also, referencing the status transition chart, obtaining transition probabilities from the element distribution to all of the element distributions, informing the child unit display unit of these transition probabilities, calculating a probability of encountering air turbulence based on the transition probabilities and whether or not the mixture distribution chart indicates an air turbulence encounter and informing this probability of encountering air turbulence to the child unit display unit;

wherein the child unit classification precedent base makes a request to the classification precedent base and obtains the classification chart and the status transition chart, and provides these according to a request from the child unit element data classification determination unit; and wherein the child unit display unit displays the class element distribution, the transition probabilities and the probability of encountering air turbulence obtained from the child unit element data classification determination unit, and issues a warning in the case when the probability of encountering air turbulence satisfies predetermined conditions.

2. An aircraft-mounted air turbulence warning system according to claim 1, further comprising:

a random atmospheric modeling unit for using regional data from the vicinity surrounding the parent unit to perform a simulation of airflow, randomly generating a velocity vector and a position for a mock aircraft in this simulation and making this mock aircraft perform a mock flight, generating mock measurement results which should be measured by the measurement unit of the child unit in the case when the child unit were mounted on the mock aircraft and notifying these results to the element data determination unit, wherein the element data determination unit processes the data from the precedent base and the random atmospheric modeling unit in accordance with the predetermined range being designated as the subject of this processing and turns the data into the element data, and records this in the classification precedent base.

3. An aircraft-mounted air turbulence warning system according to claim 1, wherein classification is performed by, assuming a mixture distribution made up of a plurality of distributions, estimating the mixing proportions and the mixture distribution parameters of the element distributions;

wherein the classification precedent base accumulates correspondences between the mixture distribution parameters and the element distribution identifiers, and correspondences between the element distribution identifiers and the element data;

wherein the element data classification unit inputs the number of distributions assumed to be mixed, obtains mixture distribution parameters by preparing the element data as the mixture distribution based on the mixture number and records in the classification precedent base correspondences between the mixture distribution identifiers and the mixture distribution parameters; and wherein the child unit element data classification determination unit determines which element distribution the element data belongs to, and records in the classification precedent base correspondences between the element data and the element distribution identifiers corresponding to the element data.

4. An aircraft-mounted air turbulence warning system according to claim 3, wherein the element distribution is a multi-dimensional normal distribution having no covariance component, and mixture distribution parameters are sought for a mixture distribution made up of a predetermined number of the element distributions to be mixed that are added with weights, and correspondences between the mixture distribution identifiers and the mixture distribution parameters are recorded in the classification precedent base;

wherein the element data change classification unit makes each element data belong to the element distribution in which the product of the probability density of the element data of that element distribution and the mixing proportion for that element distribution is the greatest of all the element distributions; and wherein the element data classification unit performs the following steps of:

a subject range investigation step in which an average, a variance, a number of types of values and a total number of values which are not null values are investigated with respect to each attribute;

an initial distribution generation step in which the initial distribution for an element distribution, which has the initial values such that the average values of the attributes are to be average values which are mutually different from each other with respect to the items being measured for which there are a predetermined number or more of types of values, and for measured items having less than the predetermined number of types of values, the average values are chosen from among the types of values, and for the variance, an appropriate number such as a number other than 0 is obtained, is generated for a number equal to the number of classifications;

a repeating improvement step having an expectation value calculation sub-step, in which averages, variances and mixing proportion for each of the element distributions are used as a basis to calculate a probability density for each of the element data; an element distribution updating sub-step, in which for each element data a density function ratio is calculated for each provisional element distribution and is used to determine a proportion of contribution therefrom, for each element distribution the proportion of contribution is multiplied by the values of each element data to obtain a value, the number of pieces of element data is obtained as a sum total of the respective proportions of contribution, and this value and this sum total are used as a basis for a new average and variance for the provisional element distribution; and a completion determination sub-step, in which changes in the parameter combinations of the provisional distribution are monitored, and the repeating improvement ends when the parameter combination does not change during the course of the number of repetitions, or when the same parameter combination repeatedly appears a predetermined number of times, or when the number of repetitions has been executed a predetermined number of times; and a completion step, in which the parameter combination which has been obtained is recorded into the classification precedent base together with an element distribution identifier.

5. An aircraft-mounted air turbulence warning system according to claim 3, wherein the repeating improvement step comprises the following steps of:

an expectation value calculation sub-step, in which provisional averages, variances and mixing proportion for each of the element distributions are used as a basis to calculate probability density for each of the element data, an annealing parameter greater than 0 and equal to or less than 1 is used to record the probability density raised to the power of the annealing parameter;

an element distribution updating sub-step, in which for each element data the ratio among the probability densities for each provisional element distribution, which have been raised to the power of the annealing parameter and recorded in the initial value calculation sub-step, is calculated and this is used as a proportion of contribution therefrom, for each element distribution the contribution is multiplied by the values of each element data to obtain a value, the number of pieces of element data is obtained as a sum total of the respective proportions of contribution, and this value and this sum total are used as a basis for a new average and variance for the provisional element distribution;

a completion determination sub-step, in which changes in the parameter combinations of the provisional distribution are monitored, and the repetition of the annealing parameter ends when the parameter combination does not change during the course of the number of repetitions, or when the same parameter combination repeatedly appears a predetermined number of times, or when the number of repetitions has been executed a predetermined number of times; and an annealing sub-step, in which the outer side of the repetition is ended in the case when the value of the annealing parameter is increased in accordance with a predetermined plan, the procedure subsequent to the anticipated value calculation sub-step is repeated and the annealing parameter has become equal to or greater than 1.

* * * * *